3,047,630
PRODUCTION OF CONDENSATION PRODUCTS OF ALIPHATIC ALCOHOLS

Leslie Ernest Addy, Dollar, Scotland, assignor to British Hydrocarbon Chemicals Limited, London, England, a British company
No Drawing. Filed June 15, 1959, Ser. No. 820,132
Claims priority, application Great Britain July 7, 1958
8 Claims. (Cl. 260—593)

The present invention relates to the production of condensation products of aliphatic alcohols.

The conversion of the lower primary and secondary aliphatic alcohols to the corresponding aldehydes and ketones by contacting them in the vapour phase with a dehydrogenating catalyst is well known. It is also known that in some cases, for instance in the production of acetone from isopropanol, and in the presence of certain catalysts, small amounts of higher condensation products such as higher ketones and the corresponding carbinols are formed as by-products. However, it appears from the literature that those catalysts which give such condensation products have a high activity for dehydration of the alcohols to olefins and have a poor catalyst life. The very undesirable formation of olefins, e.g. propylene from isopropanol and of higher olefins from higher carbinols, combined with the short life of the catalyst and the low yields of condensation products obtained has hitherto made this route to the higher ketones and carbinols less attractive than the multi-stage processes starting from acetone.

It is an object of the present invention to provide an improved process for the production of higher ketones and carbinols from lower aliphatic alcohols.

According to the present invention the process for the production of condensation products of aliphatic alcohols comprises contacting a lower aliphatic alcohol in the vapour phase at an elevated temperature with a supported nickel catalyst, which has been treated with an alkali metal compound or compounds as hereinafter defined.

The catalyst used in the process of the present invention is a nickel catalyst supported on an inert supporting material. A wide variety of supports known in the art may be used, but it is preferred to use kieselguhr. The supported nickel catalyst is promoted by treatment with an alkali metal compound. The alkali metal compounds which may be used are the oxides and hydroxides of the alkali metals, and their salts with weak inorganic or organic acids, such as the carbonates, bicarbonates and acetates or mixtures of two or more of these compounds. It is preferred to use compounds of potassium, and in particular potassium hydroxide as the promoting agent. The treatment can be carried out in any suitable manner, for instance by impregnating the catalyst with an aqueous solution of sodium or potassium hydroxide, and subsequently reducing the impregnated catalyst with hydrogen. A preferred catalyst is made by impregnating nickel oxide/kieselguhr pellets with an aqueous solution of potassium hydroxide of a concentration sufficient to produce a catalyst containing 1% of potassium hydroxide, and heating the catalyst in the presence of hydrogen at an elevated temperature, for instance 300 to 340° C.

The alcohol starting material may be any lower monohydric aliphatic alcohol, including cyclo aliphatic alcohols. It is preferred to use secondary aliphatic alcohols such as isopropanol, and sec-butanol, and the use of isopropanol is particularly preferred. If desired mixtures of alcohol with the corresponding ketone may be used. In the reaction some of the alcohol is converted into the corresponding ketone, and this may be separated from the higher boiling condensation products and recycled to the reaction mixture. The reaction may be carried out in the presence of inert diluents such as nitrogen, or paraffin hydrocarbons. The process may also be carried out in the presence of a hydrogen acceptor, for instance as described in our application Serial No. 752,193, now abandoned. Suitable hydrogen acceptors include olefinically unsaturated hydrocarbons such as propylene, butene, isobutene, the pentenes, cyclohexene and the like, acetylenic hydrocarbons, aromatic hydrocarbons and other compounds such as benzene, and quinone. It is particularly preferred to use as hydrogen acceptors the lower olefinic hydrocarbons such as the pentenes, and butenes. During the reaction the hydrogen acceptor is at least partially hydrogenated.

The reaction may be carried out over a moderately wide range of temperatures, for instance between 100° and 300° C. It is preferred to use temperatures of the order of 150° to 250° C. It is preferred to carry out the reaction at atmospheric pressure, but reduced or increased pressures may also be used.

The products of the reaction may be isolated in the conventional manner, for instance by condensation followed by fractionation.

A variety of different products may be obtained depending on the starting materials used. Thus the major products obtained from isopropanol, in addition to acetone, are methyl isobutyl ketone and methyl isobutyl carbinol together with some diisobutyl ketone.

The following examples are given further to illustrate the process of the present invention.

EXAMPLE 1

A nickel/kieselguhr catalyst was prepared by impregnating nickel oxide/kieselguhr pellets with an aqueous potassium hydroxide solution containing 16.5 grams of potassium hydroxide per litre of distilled water, 0.6 gram of solution being added for each gram of dry nickel oxide/kieselguhr pellets. This gave a proportion of one percent by weight of potassium hydroxide on the catalyst. The resulting moist product was then dried for 16 hours at 120° C. and reduced with hydrogen at 300 to 340° C. for 16 hours.

Two processes (Table 1, runs 1 and 2) were carried out in which a mixture of isopropanol and pentanes (inert diluent) were passed at atmospheric pressure over 50 grams of the catalyst, the catalyst temperature being about 160° C. In run 2 the catalyst had been steam treated at 125 to 230° C. after being reduced with hydrogen. The reaction products were recovered by condensation followed by fractional distillation, and were estimated by infra-red spectroscopic and gas chromatographic methods. The results are shown in Table 1.

By way of comparison with these examples when the process was repeated (run 3, Table 1) using a nickel/kieselguhr catalyst, which had been reduced and steam treated, but which had not been alkali promoted, markedly reduced yields of methyl isobutyl ketone and other condensation products were obtained.

*Table 1*

| Run No. | 1 | 2 | 3 |
|---|---|---|---|
| Isopropanol Feed, moles/hour | 0.24 | 0.24 | 0.20 |
| Pentanes Feed, moles/hour | 0.44 | 0.46 | 0.33 |
| Moles percent isopropanol feed recovered as: | | | |
| Acetone | 17 | 18 | 29.4 |
| Methyl isobutyl ketone | 22 | 26 | 12.2 |
| Diisobutyl ketone | 22 | 23 | } 10.7 |
| Other high boilers | 18 | 17 | |

EXAMPLE 2

The process described in runs 1 and 2 of Example 1 was repeated except that the feed contained pentenes as a hydrogen acceptor. The reaction conditions and results are shown in Table 2, run 1.

*Table 2*

| Run No. | 1 | 2 | 3 |
|---|---|---|---|
| Steam treatment temperature, °C | 264 | Nil | Nil |
| Mean reaction temperature, °C | 166 | 164 | 163 |
| Feed, moles/hour: | | | |
| Isopropanol | 0.23 | 0.25 | 0.29 |
| Pentanes | 0.21 | 0.23 | 0.28 |
| Pentenes | 0.21 | 0.23 | 0.28 |
| Mole percent isopropanol feed recovered as: | | | |
| Acetone | 36 | 56 | 62 |
| Methyl isobutyl ketone | 35 | 25 | 21 |
| Diisobutyl ketone | 25 | 5 | 6 |
| Other condensation products | 4 | 5 | trace |

EXAMPLE 3

The process of Example 2 was repeated except that the nickel/kieselguhr catalyst was impregnated with 1% of sodium hydroxide in run 2 and with 2% of sodium hydroxide in run 3, Table 2. The reaction conditions and results are given in Table 2.

EXAMPLE 4

A mixture of sec-butanol and mixed butenes were passed at atmospheric pressure over 25 mls. of a 10–22 mesh nickel oxide/kieselguhr catalyst treated with potassium hydroxide which had been prepared as described in Example 1. The catalyst temperature was about 200–210° C. the reaction products were recovered by condensation followed by fractional distillation and were estimated by infra-red spectroscopic and gas chromatographic methods. The results are shown in Table 3.

*Table 3*

| | |
|---|---|
| Feed rate moles/hour: | |
| Sec-butanol | 0.124 |
| Butenes | 0.138 |
| Weight percent sec-butanol feed recovered as: | |
| Methyl ethyl ketone | 54 |
| $C_8$ ketone | 23 |

When the process of Example 4 was repeated using a nickel oxide/kieselguhr catalyst not promoted by potassium hydroxide less than 5% of the sec-butanol fed was converted to $C_8$ and higher ketones.

I claim:
1. The process for the production of higher ketone condensation products of lower monohydric secondary aliphatic alcohols, which comprises contacting a lower monohydric secondary aliphatic alcohol selected from the group consisting of isopropanol and secondary butanol in the vapour phase at an elevated temperature in the range of 100 to 300° C. with a nickel catalyst supported on kieselguhr, the catalyst having been prepared by impregnating nickel oxide on kieselguhr with an aqueous solution of an alkali metal compound selected from the group consisting of the oxides and hydroxides of the alkali metals, and their carbonates, bicarbonates, acetates and mixtures thereof, and then heating in the range of about 300 to 340° C. in the presence of hydrogen, and isolating the higher condensation product thus formed.

2. The process as claimed in claim 1 wherein the alkali metal compounds is a potassium compound.

3. The process as claimed in claim 1 wherein the alkali metal compound is potassium hydroxide.

4. The process as claimed in claim 3 wherein the potassium hydroxide constitutes about 1% of the catalyst.

5. The process as claimed in claim 1 wherein the alcohol is isopropanol.

6. The process as claimed in claim 1 wherein the starting material comprises a mixture of a lower monohydric secondary aliphatic alcohol with the corresponding ketone.

7. The process as claimed in claim 1 wherein the reaction is carried out at a temperature between 150 and 250° C.

8. The process for the production of higher ketone condensation products of lower monohydric secondary aliphatic alcohols, which comprises contacting a lower monohydric secondary aliphatic alcohol selected from the group consisting of isopropanol and secondary butanol in the vapor phase at an elevated temperature in the range of 100 to 300° C. with a nickel catalyst supported on kieselguhr, the catalyst having been prepared by impregnating nickel oxide on kieselguhr with an aqueous solution of an alkali metal compound selected from the group consisting of the oxides and hydroxides of the alkali metals and their carbonates, bicarbonates, acetates and mixtures thereof, and then heating with hydrogen at a temperature which effects reduction of nickel oxide, and isolating the thus formed higher ketone condensation product.

References Cited in the file of this patent
UNITED STATES PATENTS

| 2,066,496 | Taylor | Jan. 5, 1937 |
| 2,457,866 | Carter | Jan. 4, 1949 |
| 2,865,963 | Garetson et al. | Dec. 23, 1958 |